(12) United States Patent
Shen (10) Patent No.: US 11,595,556 B2
(45) Date of Patent: Feb. 28, 2023

(54) BROADCAST LIGHTING SYSTEM AND THE METHOD OF USE THEREOF

(71) Applicant: Linbin Shen, Shenzhen (CN)

(72) Inventor: Linbin Shen, Shenzhen (CN)

(*) Notice: Subject to any disclaimer, the term of this patent is extended or adjusted under 35 U.S.C. 154(b) by 199 days.

(21) Appl. No.: 17/008,241

(22) Filed: Aug. 31, 2020

(65) Prior Publication Data

US 2022/0070342 A1 Mar. 3, 2022

(51) Int. Cl.

| H04N 5/225 | (2006.01) |
|---|---|
| F21V 21/15 | (2006.01) |
| H05B 47/165 | (2020.01) |
| H05B 47/19 | (2020.01) |
| H05B 47/115 | (2020.01) |
| H05B 45/20 | (2020.01) |
| H04N 5/232 | (2006.01) |
| H04N 5/222 | (2006.01) |
| F21V 21/06 | (2006.01) |
| F21Y 115/10 | (2016.01) |
| F21Y 113/10 | (2016.01) |
| F21Y 105/18 | (2016.01) |

(52) U.S. Cl.
CPC ........... *H04N 5/2256* (2013.01); *F21V 21/15* (2013.01); *H04N 5/2228* (2013.01); *H04N 5/23203* (2013.01); *H04N 5/23299* (2018.08); *H05B 45/20* (2020.01); *H05B 47/115* (2020.01); *H05B 47/165* (2020.01); *H05B 47/19* (2020.01); *F21V 21/06* (2013.01); *F21Y 2105/18* (2016.08); *F21Y 2113/10* (2016.08); *F21Y 2115/10* (2016.08)

(58) Field of Classification Search
CPC ............. H04N 5/2256; H04N 5/23299; H04N 5/2228; H04N 5/23203; H05B 47/115; H05B 45/20; H05B 47/19; H05B 47/165; F21V 21/15; F21V 21/06; F21Y 2105/18; F21Y 2113/10; F21Y 2115/10
See application file for complete search history.

(56) References Cited

U.S. PATENT DOCUMENTS

| 8,405,947 B1 | 3/2013 | Green et al. |
|---|---|---|
| 9,835,317 B2 | 12/2017 | Yuan et al. |
| 2006/0082994 A1 | 4/2006 | Wang et al. |
| 2007/0258268 A1 | 11/2007 | Kim et al. |
| 2012/0127733 A1 | 5/2012 | Tomiyoshi et al. |
| 2012/0160260 A1 | 6/2012 | Rolston |

(Continued)

OTHER PUBLICATIONS https://www.amazon.com/s?k=ring=light=remote=control&ref=nb_sb_noss, Amazon.com: ring light remote control, printed Aug. 12, 2020, 6 pages.

(Continued)

*Primary Examiner* — Bao Q Truong
(74) *Attorney, Agent, or Firm* — Rumit R. Kanakia (57) ABSTRACT

Embodiments of a live broadcast lighting system are disclosed. In one example embodiment, the live broadcast lighting system includes a light emitting apparatus, a control box being connected to the light emitting apparatus, and a device holder coupled to the control box. The device holder can be configured to releasably retain a video recording device. The control box can include an electronic control circuit configured to control rotation of the light emitting apparatus. The device holder can be configured to be rotatable independent of the rotation of the light emitting apparatus.

19 Claims, 7 Drawing Sheets

(56) References Cited

U.S. PATENT DOCUMENTS

| | | |
|---|---|---|
| 2012/0239521 A1 | 9/2012 | Acworth et al. |
| 2013/0063042 A1 | 3/2013 | Bora et al. |
| 2014/0036511 A1 | 2/2014 | Whitefield et al. |
| 2014/0226317 A1 | 8/2014 | Livesay et al. |
| 2014/0317974 A1 | 10/2014 | Acworth et al. |
| 2015/0043222 A1 | 2/2015 | Jiang et al. |
| 2015/0359075 A1 | 12/2015 | Keirstead et al. |
| 2015/0371534 A1 | 12/2015 | Dimberg et al. |
| 2016/0153650 A1 | 6/2016 | Chien |
| 2016/0187555 A1 | 6/2016 | Yuan et al. |
| 2016/0277660 A1* | 9/2016 | Kaiser .................. H04W 4/80 |
| 2016/0290603 A1 | 10/2016 | Morello et al. |
| 2017/0045214 A1 | 2/2017 | Johnson |
| 2017/0118385 A1 | 4/2017 | Vargas et al. |
| 2017/0205572 A1 | 7/2017 | Nichol et al. |
| 2018/0164491 A1 | 6/2018 | Den Breejen et al. |
| 2018/0270410 A1* | 9/2018 | Lyle .................. G03B 17/561 |
| 2019/0003692 A1 | 1/2019 | Frederiksen |
| 2019/0030360 A1 | 1/2019 | Iwahashi |

OTHER PUBLICATIONS

Patel, et al., "Motion based Object Tracking," Int'l Jnl EECS, vol. 7, Issue 4, Apr. 2018, 9 pages.

Caifeng Shan, "Gesture Control for Consumer Electronics," Chapter—Sep. 2010, 24 pages.

\* cited by examiner

BROADCAST LIGHTING SYSTEM AND THE METHOD OF USE THEREOF

FIELD

The present disclosure relates to the field of illumination. Specifically, the present disclosure concerns embodiments of systems and methods for controlling lighting during live broadcasting.

BACKGROUND

Live broadcasting requires a good and flexible light source. This is particularly important for live streaming and selfie, where the subject to be filmed (also referred to as "target subject" hereinafter) tends to be the focus of the illuminating light and is positioned away from the light source. Although some of the live streaming systems allow the target subject to use a remote control to adjust the lighting condition during live streaming or selfie, such adjustment is usually limited to activation/deactivation of the light source or strength of the illuminating light. Accordingly, improvements to a live broadcast lighting system is desirable to provide the target subject more flexibility and enhanced control of lighting during live stream or selfie recording.

SUMMARY

The present disclosure is directed toward systems and methods relating to live broadcast lighting control.

Certain embodiments of the disclosure concern a live broadcast lighting system. The live broadcast lighting system can include a light emitting apparatus, a control box being connected to the light emitting apparatus, and a device holder coupled to the control box. The device holder can be configured to releasably retain a video recording device. The control box can include an electronic control circuit configured to control rotation of the light emitting apparatus. The device holder can be configured to be rotatable independent of the rotation of the light emitting apparatus.

In certain embodiments, the electronic control circuit can be configured to control the light emitting apparatus to rotate in three dimensions about a geometric center of the light emitting apparatus.

In certain embodiments, the electronic control circuit can be configured to control the rotation of the device holder in three dimensions about a geometric center of the device holder.

In certain embodiments, the light emitting apparatus can include a plurality of light sources. The plurality of light sources can include a first set of cold white LED lamp beads and a second set of warm white LED lamp beads. The first set of cold white LED lamp beads and the second set of warm white LED lamp beads can be juxtaposed around a peripheral region of the light emitting apparatus.

In certain embodiments, the electronic control circuit can be configured to independently control switching ON/OFF and adjusting light intensity of each light source so as to create a preprogrammed light emitting pattern.

In certain embodiments, the preprogrammed light emitting pattern can include a preprogrammed spatial distribution of the plurality of light sources that are turned ON or OFF.

In certain embodiments, the preprogrammed light emitting pattern can include a preprogrammed change of light intensity over a period of time for at least one of the plurality of light sources.

In certain embodiments, the live broadcast lighting system can further include a remote control device configured to wirelessly communicate with the electronic control circuit so as to allow a user operating the remote control device to remotely control rotation and/or lighting of the light emitting apparatus.

In certain embodiments, the remote control device can include a mobile phone which is configured to communicate with electronic control circuit via Bluetooth protocol.

In certain embodiments, the remote control device can be configured to remotely control rotation of the device holder.

In certain embodiments, the remote control device can be configured to wirelessly communicate with the video recording device so as to allow the user to remotely control operation of the video recording device.

In certain embodiments, the live broadcast lighting system can further include a touch panel electronically coupled to the electronic control circuit. The touch panel can be configured to allow a user to control rotation and/or lighting of the light emitting apparatus by interacting with a menu presented on the touch panel.

In certain embodiments, the live broadcast lighting system can further include a motion sensor electronically coupled to the electronic control circuit. The motion sensor can be configured to detect movement of a target subject, and the light emitting apparatus can be configured to shed light on the target subject.

In certain embodiments, the motion sensor can be integrated with the video recording device.

In certain embodiments, the motion sensor can be separate from and operate independently of the video recording device.

In certain embodiments, the motion sensor can be configured to detect a gesture of the target subject and the electronic control circuit can be configured to translate the gesture into a corresponding command which controls at least one of the functions including: rotation of the light emitting apparatus, rotation of the device holder, lighting of the light emitting apparatus, and operation of the video recording device.

In certain embodiments, the motion sensor can be configured to detect a positional change of the target subject and the electronic control circuit can be configured to cause rotation of the light emitting apparatus so as to ensure light emitted from the light emitting apparatus remain focused on the target subject.

In certain embodiments, the motion sensor can be configured to detect a positional change of the target subject and the electronic control circuit can be configured to change light emitting pattern or strength of the light emitting apparatus.

In certain embodiments, the motion sensor can be configured to detect a positional change of the target subject and the electronic control circuit can be configured to cause rotation of the video recording device so as to ensure the target subject remains in focus of the video recording device.

Certain embodiments of the disclosure concern also concern a method for remote control of a live broadcast lighting system including a light emitting apparatus and a video recording device. The method can include remotely turning ON or OFF of a plurality of light sources of a light emitting apparatus, remotely changing light intensity of the plurality of light sources that are turned ON, remotely rotating the light emitting apparatus in three dimensions about a geometric center of the light emitting apparatus, remotely adjusting an angle of the video recoding device independently of rotating the light emitting apparatus, and remotely controlling start and stop of a recording session by the video recording device. Rotating the light emitting apparatus can include detecting a movement of a target subject and changing orientation of the light emitting apparatus in response to the movement of the target subject.

The foregoing and other objects, features, and advantages of the invention will become more apparent from the following detailed description, which proceeds with reference to the accompanying figures.

DETAILED DESCRIPTION

System Overview

Figure 1:
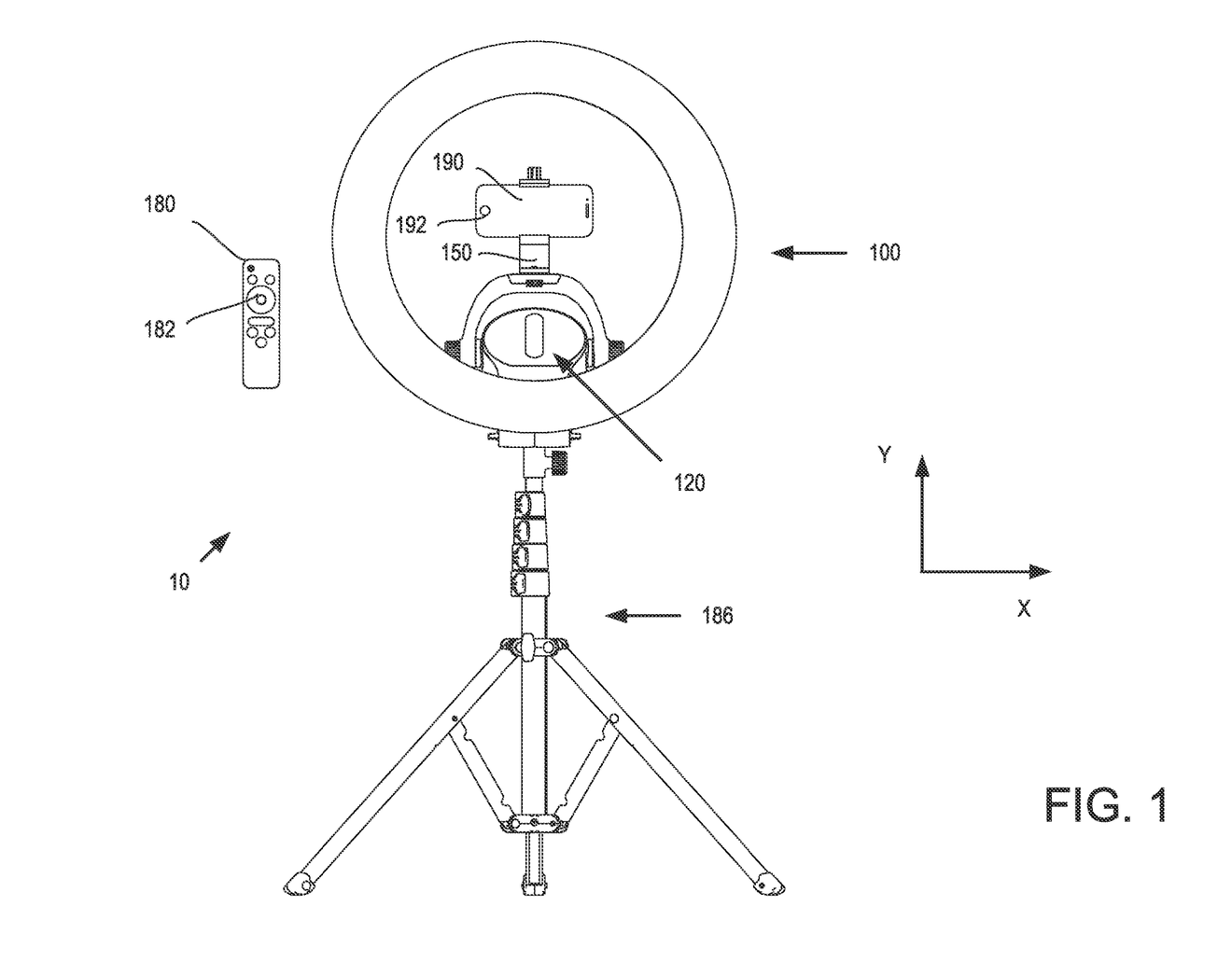
FIG. 1 is a frontal view of a live broadcast lighting system, according to an example embodiment.
Figure 2:
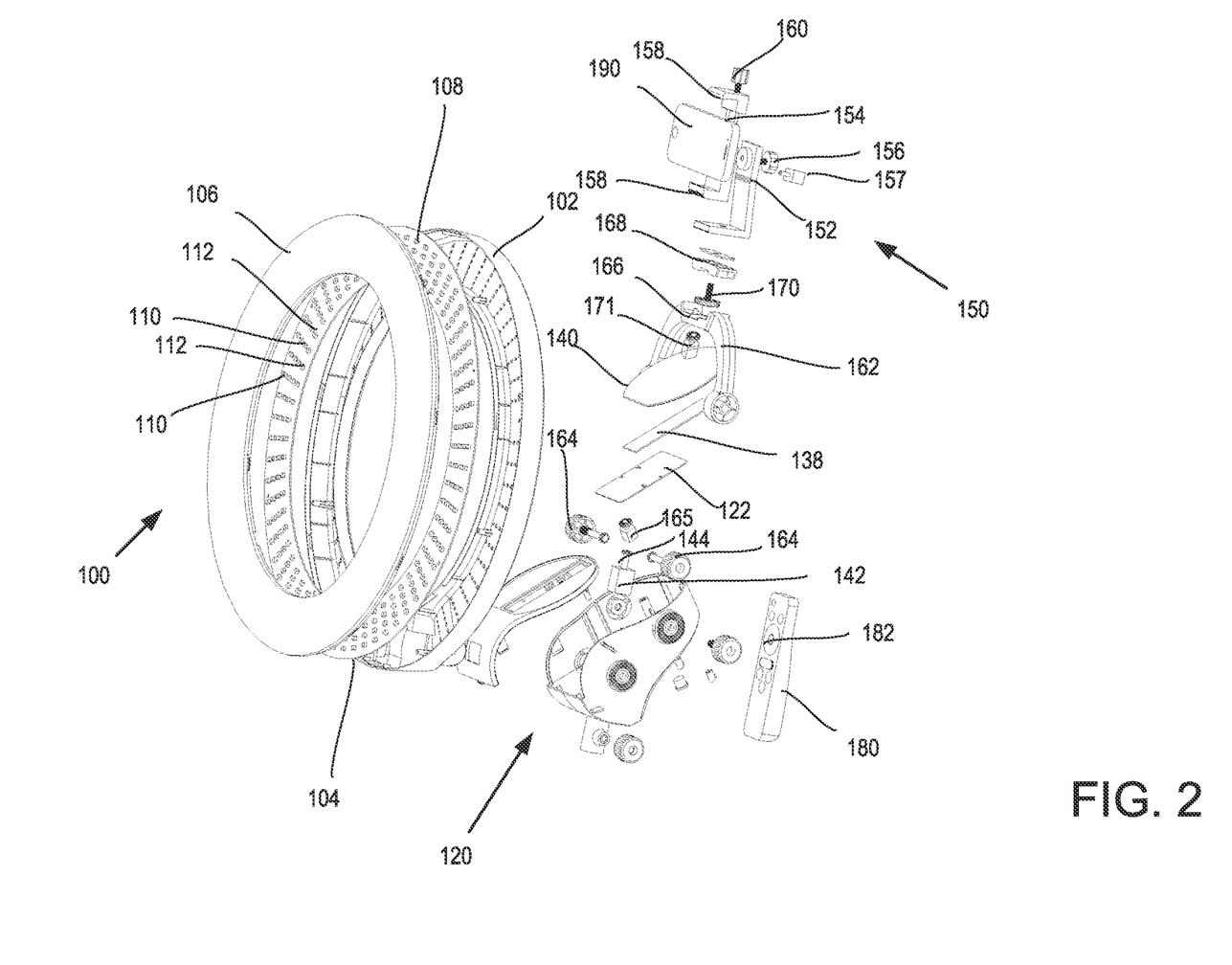
FIG. 2 is an exploded view of some components of the live broadcast lighting system depicted in FIG. 1.
Figure 3:
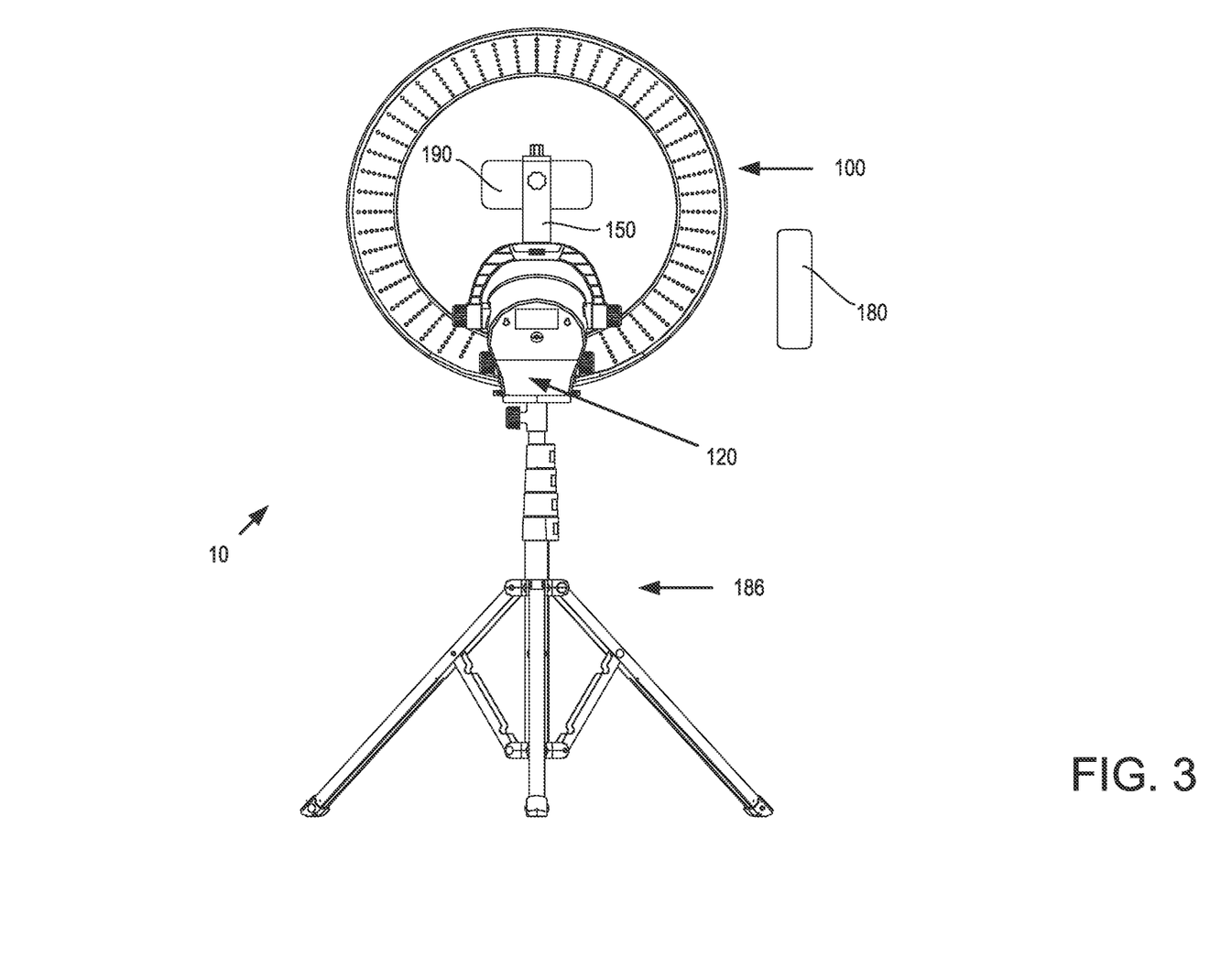
FIG. 3 is a back view of the live broadcast lighting system depicted in FIG. 1.

FIGS. 1-3 illustrate a live broadcast lighting system 10, according to one example embodiment. Example methods of using the live broadcast lighting system 10 are also described below.

As shown, the live broadcast lighting system 10 includes a light emitting apparatus 100, a control box 120 being connected to the light emitting apparatus 100, and a device holder 150 coupled to the control box 120. In the depicted embodiment, the live broadcast lighting system 10 also includes a remote control device 180 configured to wirelessly communicate with the control box 120 so as to allow a user (e.g., the target subject) operating the remote control device 180 to remotely control rotation and/or lighting of the light emitting apparatus 100. In certain embodiments, the light emitting apparatus 100 can be removably attached to a support stand 186, such as a tripod or the like.

In certain embodiments, the live broadcast lighting system 10 can further include a video recording device 190, which can be releasably retained by the device holder 150. In an example embodiment, the video recording device 190 can be a video camera. In another example embodiment, the video recording device 190 can be a smart phone that has video recording capabilities. In yet another embodiment, the video recording device 190 can be a digital camera that is configured to record one or more still photos of the target subject.

Light Emitting Apparatus

In the depicted embodiment, the light emitting apparatus 100 has a circular ring shape. In alternative embodiments, the light emitting apparatus 100 can have non-circular ring shapes. For example, the shape of the light emitting apparatus 100 can be a square ring, an oval ring, a circular disk, or the like.

In the depicted embodiment, the light emitting apparatus 100 includes a housing 102, a light-emitting light panel 104 retained inside the housing 102, and a transparent or translucent cover 106 placed in front of the light-emitting panel 104. In certain embodiments, the cover 106 can have a plurality of projections (not shown) arranged on its peripheral edge. The plurality of projections can be configured to matingly engage with corresponding notches (not shown) disposed at an inner wall of the housing 102 so as to releasably couple the cover 106 and the housing 102 together. In other embodiments, the cover 106 and the housing 102 can be coupled together by alternative means, such as hinges, buckles, clips, latches, and the like.

The light emitting apparatus 100 can include a plurality of light sources 108. In an example embodiment, the light sources 108 are light emitting electrode (LED) lamp beads. In the depicted embodiments, the LED lamp beads are uniformly distributed with equal inter-light distance. In other embodiments, the LED lamp beads are distributed non-uniformly so that the density of the LED lamp beads in a selected area of the light emitting apparatus 100 is higher or lower than the remaining areas of the light emitting apparatus 100.

In certain embodiments, the number of light sources 108 can range between about 100 and 500. In certain embodiments, the number of light sources 108 ranges between about 200 and 400. In one particular embodiment, the number of light sources 108 is about 360.

In certain embodiments, the plurality of light sources 108 can include a first set of cold white LED lamp beads 110 and a second set of warm white LED lamp beads 112. In a specific embodiments, the number of cold white LED lamp beads 110 equals the number of warm white LED lamp beads 112, and the first set of cold white LED lamp beads 110 and the second set of warm white LED lamp beads 112 can be juxtaposed around a peripheral region of the light emitting apparatus 100. In other embodiments, the number of cold white LED lamp beads 110 is not equal to the number of warm white LED lamp beads 112. For example, the number of cold white LED lamp beads 110 can be a multiple (or fraction) of the number of warm white LED lamp beads 112, and each pair of warm white LED lamp beads 112 can be separated by multiple cold white LED lamp beads 110 (or vice versa).

In other embodiments, the LED lamp beads include color LED lamp beads. Still in other embodiments, the light sources 108 can be non-LED types, such as incandescent, halogen, compact florescent light, etc.

In one embodiment, the light emitting apparatus 100 can be used to provide a key light that can highlight the target subject. In another embodiment, the light emitting apparatus 100 can be used provide a fill light which can fill the shadows created by the key light and balance the exposure. The fill light can also compensate illumination for some other illuminating devices or under certain circumstances where the illumination is insufficient.

Control Box

The control box 120 can include an electronic control circuit 122 (e.g., printed on a circuit board) which is configured to control overall functionalities of the live broadcast lighting system 10, as described below.

Figure 4:
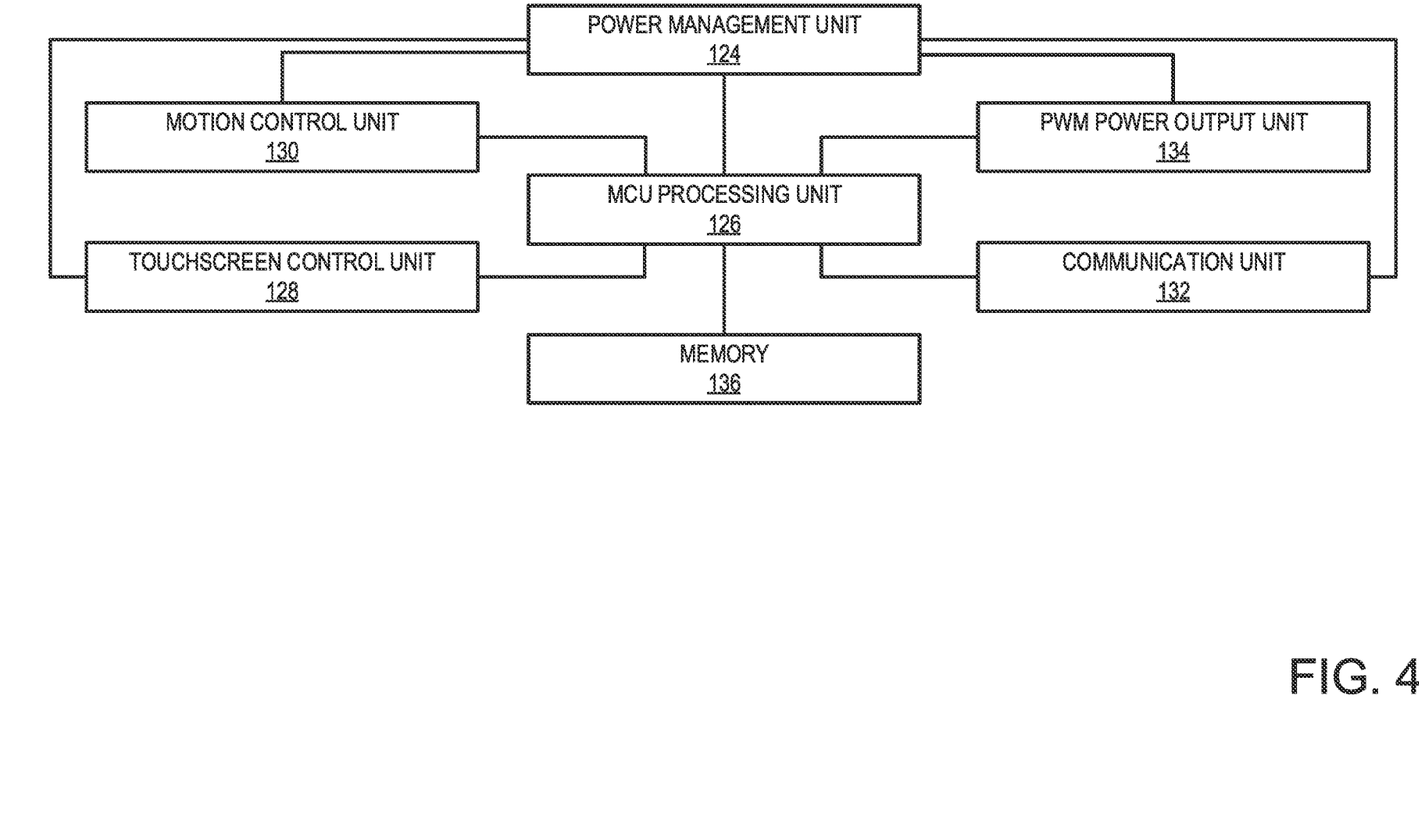
FIG. 4 is a functional block diagram of an electronic control circuit that can be incorporated in the live broadcast lighting system depicted in FIG. 1, according to one example embodiment.

FIG. 4 shows a high-level functional block diagram of the electronic control circuit 122, according to one example embodiment. As shown, the electronic control circuit 122 includes a power management unit 124, a microcontroller (MCU) processing unit 126, a touch screen control unit 128, a motion control unit 130, a communication unit 132, a pulse-width modulation (PWM) power output unit 134, and a tangible memory 136. The touch screen control unit 128, the motion control unit 130, the communication unit 132, the PWM power output unit 134, and the tangible memory 126 can be electrically connected with the MCU processing unit 126. The touch screen control unit 128, the motion control unit 130, the communication unit 132, the PWM power output unit 134, and the tangible memory 136 can be electrically connected with the power management unit 136.

The power management unit 124, which can be connected to an external power supply or an internal battery source, can provide electrical energy for the touch screen control unit 128, the motion control unit 130, the communication unit 132, the PWM power output unit 134, and the tangible memory 136.

The MCU processing unit 126 can execute computer-executable instructions, such as for implementing the features described herein. The MCU processing unit 126 can be a general-purpose central processing unit (CPU), processor in an application-specific integrated circuit (ASIC), or any other type of processor. In certain embodiments, the MCU processing unit 126 can include multiple CPUs (including a graphics processing unit) to execute computer-executable instructions to increase processing power. The tangible memory 136 can be volatile memory (e.g., registers, cache, RAM), non-volatile memory (e.g., ROM, EEPROM, flash memory, etc.), or some combination of the two, accessible by the MCU processing unit 126. The memory 136 can store software implementing one or more innovations described herein, in the form of computer-executable instructions suitable for execution by the MCU processing unit 126.

The touch screen control unit 128 is electronically connected with a touch panel 138 through which a user can provide touch input(s) to the MCU processing unit 126, as described more fully below.

The motion control unit 130 can communicate with one or more motion sensors, which can sense movement of the target subject, based on which the lighting condition and the video recording can be adjusted, as described further below.

The communication unit 132 enables wired or wireless communication over a communication medium (e.g., a connecting network) to another computing entity. The communication medium conveys information such as computer-executable instructions, compressed graphics information, or other data in a modulated data signal. The communication unit 132 support remote control of lighting condition and video recording, as described further below.

The pulse-width modulation (PWM) power output unit 134 can control one or more motor rotary devices which are configured to rotate the light emitting apparatus 100 and/or the device holder 150, as described more fully below.

Touch Panel

In one embodiment, the control box 120 can include a touch panel 138 which is electronically coupled to the touch screen control unit 128 of the electronic control circuit 122. Optionally, the touch panel 138 can be covered by a transparent protective screen 140. The touch panel 138 can receive touch input from a user and detect a touch point which represents a location on the touch panel 138 where the user touches. For example, the touch panel 138 can include a touch surface which can sense a touch of the user's finger or a stylus pen, and generate data representing the position or coordinates of the sensed touch point. By executing computer-executable instructions, the touch panel 138 can present a menu (not shown) through which a user can interact to control various operations of the live broadcast lighting system 10.

According to one embodiment, the menu can include a plurality of control keys/buttons and/or status indicators. For example, the menu can include a power switch key, a light switch key, an indicator light, and a plurality of light intensity bars that are arranged sequentially (e.g., in horizontal or vertical direction). Touch of the power switch key can activate or deactivate the light sources 108 in the light emitting apparatus 100, with corresponding turning ON or OFF of the indicator light. Touch of the light switch key can switch between different lighting regulation modes such as light regulation (e.g., enabling light intensity adjustment for the cold white LED lamp beads 110) and color regulation (e.g., enabling light intensity adjustment for the warm white LED lamp beads 112). Touch of the light intensity bars can adjust (i.e., increase or decrease) the light intensity emitted from the respective light sources 108.

In other embodiments, the menu can include other controls and/or indicators through which the user can trigger one or more commands to control rotation of the light emitting apparatus 100 and/or more advanced lighting features, as described below. In some embodiments, the menu can be organized in a hierarchical structure including sub-menus, pop-up menus, etc.

Figure 5:
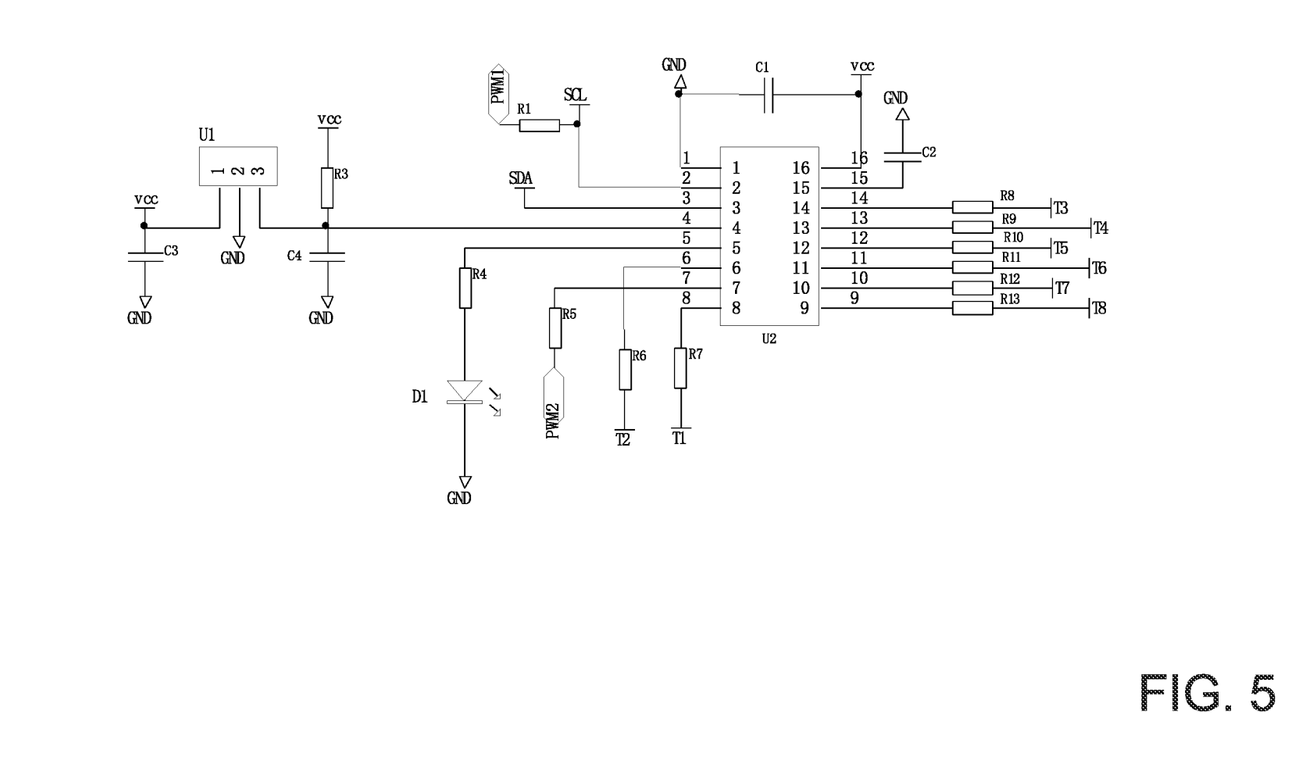
FIG. 5 is a circuit diagram depicting a touch screen control unit that can be incorporated in the live broadcast lighting system depicted in FIG. 1, according to one example embodiment.

FIG. 5 shows a circuit diagram depicting a touch screen control unit 128, according to one example embodiment. As shown, the touch screen control unit 128 includes a chip U1 which is a regulator configured for stabilizing the voltage, a chip U2 which is a micro controller configured for overall light control, and a light emitting diode D1. A pin 1 of the chip U1 is connected to a power supply VCC terminal and grounded via a third capacitor C3, a pin 2 of the chip U1 is grounded, a pin 3 of the chip U1 is connected with a common end of a pin 4 of the chip U2, an end of a third resistor R3, and an end of the a fourth capacitor C4. The other end of the third capacitor C3 is connected with the power supply VCC terminal, and the other end of the fourth capacitor C4 is grounded. A pin 2 and a pin 7 of the chip U2 are respectively connected to an PWM1 output terminal and the PWM2 output terminal through a first resistor R1 and a fifth resistor R5. A pin 5 of the chip U2 passes through the fourth resistor R4 and an anode of the light-emitting diode D1 in turn and then grounds. A pin 8, a pin 6, a pin 14, a pin 13, a pin 12, a pin 11, a pin 10, and a pin 9 of the chip U2 are respectively connected to touch terminals T1 to T8 (which are located underneath respective menu items, such as control keys/buttons presented on the touch panel) through a seventh resistor R7, a sixth resistor R6, an eighth resistor R8, a ninth resistor R9, a tenth resistor R10, a eleventh resistor R11, a twelfth resistor R12, and a thirteenth resistor R13. The first capacitor C1 is connected between the pin 1 and a pin 16 of the chip U2. The pin 1 of chip U2 is grounded, and the pin 16 of chip U2 is connected to an anode terminal of the power supply.

Remote Control

In certain embodiments, the operation of the live broadcast lighting system 10 not only can be controlled by using the touch panel, but also can be remotely controlled by a remote control device 180, which is in wireless communication with the communication unit 132 of electronic control circuit 122. The wireless communication can take a variety of forms, such as infrared, ZigBee, Bluetooth, and so on.

Figure 7:
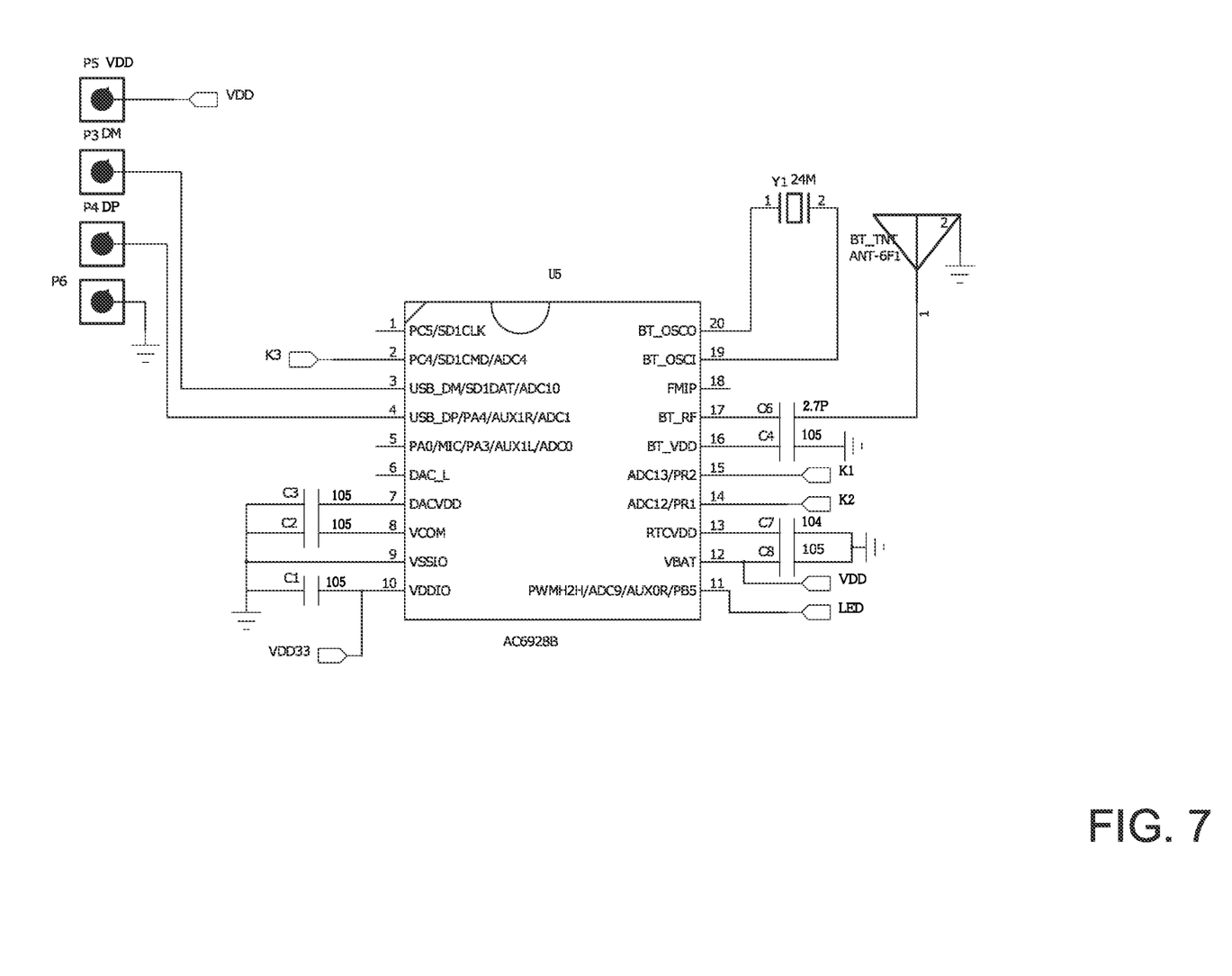
FIG. 7 is a circuit diagram depicting a remote control processing unit that can be incorporated in the live broadcast lighting system depicted in FIG. 1, according to one example embodiment.

FIG. 7 shows a remote control circuit diagram implemented in the remote control device 180 which can wirelessly communicate with the video recording device 190 and/or the communication unit 132 of the electronic control circuit 122, according to one example embodiment. In the depicted embodiment, the remote control circuit includes a remote control processing chip U5, which can be connected to a functional button and a self-timer selection button. Pressing the functional button can establish wireless communication between the remote control device 180 and the video recording device 190 (such as a smartphone), e.g., paring with the video recording device by Bluetooth. Pressing the self-timer selection button can trigger the video recording device 190 to start/stop a video recording or trigger a self-timed photo shoot. In a specific embodiment, the model of the remote control processing chip U5 is AC6928B, which supports Bluetooth communication protocol.

In certain embodiments, the remote control device 180 can include a plurality of buttons or keys 182 which allow a user to selectively enter commands to control various functionalities of the live broadcast lighting system 10. For example, the remote control device 180 can be configured to remotely control the light emitting apparatus 100 to adjust the lighting conditions, as described below. In another example, the remote control device 180 can be configured to control rotation of the light emitting apparatus 100 and/or the device holder 150, as described below. Yet in another embodiment, the remote control device 180 can be configured to wirelessly communicate with the video recording device 190 so as to allow the user to remotely control operation of the video recording device 190 (e.g., start, pause, continue, stop video recording, zoom adjustment of the video recording, optical and/or digital filter adjustment of the video recording, etc.).

In one specific embodiment, the remote control device 180 can include a mobile smart phone which is configured to communicate with electronic control circuit 122 via the Bluetooth protocol.

Lighting Control

As noted above, both the touch panel and the remote control device 180 can communicate with the electronic control circuit 122 located in the control box 120. Thus, a user can control the lighting condition of a live broadcast by interacting with the touch panel, or operating the remote control device 180, or both.

The inventor has discovered that conventional live broadcasting lighting systems generally only allow a user limited controls of the lighting condition. For example, the user can only turn ON/OFF of all, or at most, a subset of the light sources, but cannot turn ON/OFF of individual or artificially selected light source. In addition, the user can only adjust the light intensity of all, or at most, a subset of the light sources, but cannot adjust the light intensity of individual or artificially selected light source. Further, user adjustment of the light intensity is usually limited to simply increasing or decreasing light intensity, but not supporting other dynamic adjustment patterns. In contrast, the technology described herein provides the user more flexible control of lighting conditions to create customized visual effects.

In one embodiment, using the touch panel and/or the remote control device 180, the user can cause the electronic control circuit 122 to independently control switching ON/OFF and adjusting light intensity of each light source 108 so as to create a preprogrammed light emitting pattern.

For example, the user can control the electronic control circuit 122 so that all or some of the cold white LED lamp beads 110 are turned ON while all warm white LED lamp beads 112 are turned OFF, or vice versa. In another example, the user can control the electronic control circuit 122 so that all or some of the light sources 108 located on the top half (or bottom half, or left half, or right half) of the light emitting apparatus 100 are turned ON while all light sources 108 located on the other half are turned OFF. Other lighting patterns, including some preprogrammed ON/OFF light emitting patterns (i.e., user pre-defined spatial distribution of the light sources 108) can be similarly controlled by the user.

In another example, the light intensity of selected light sources 108 can be controlled by the user following a specific pattern, such as remaining constant, gradually increasing, gradually decreasing, periodically turning ON/OFF or blinking, periodically increasing and decreasing following a pattern (e.g., zigzag, sinusoidal, random, etc.), and so on. In other words, the user can control the light emitting pattern of any one of the light sources 108 so that its light intensity can change over a period of time following a preprogrammed pattern.

Rotation of Light Emitting Apparatus

As shown in FIG. 2, the lower end of the light emitting apparatus can be connected to the control box 120 through a motor rotary device 142. As described more fully below, by actuating the motor rotary device 142, rotation of the light emitting apparatus 100 can be controlled. In one embodiment, a user can control rotation of the light emitting apparatus 100 by interacting with the touch panel 138. In another embodiment, the user can control rotation of the light emitting apparatus 100 by operating the remote control device 180.

In one embodiment, the motor rotary device 142 can include a stepping motor (not shown), a driver gear (not shown), a driven gear (not shown), and a rotating shaft 144. The driver gear can be disposed on an output shaft of the stepping motor, the driven gear can be disposed on the rotating shaft 144, and the driving gear can be in meshing connection with the driven gear such that activation of the stepping motor can cause corresponding rotation of the driving gear, which in turn causes rotation of the driven gear and the rotating shaft 144. Rotation of the rotating shaft 144 can then cause corresponding rotation of the light emitting apparatus 100.

As described herein, actuation of the motor rotary device 142 can rotate the light emitting apparatus 100 about its geometric center along a predefined axis.

For example, actuation of the motor rotary device can cause vertical tilting of the light emitting apparatus 100. In other words, the light emitting apparatus 100 can rotate about its geometric center such that the vertical axis of the light emitting apparatus 100 forms a vertical tilt angle relative to the Y-axis (which extends through the support stand 186 and is perpendicular to the ground, as depicted in FIG. 1). For example, the top half of the light emitting apparatus 100 can tilt forwardly and the bottom half of the light emitting apparatus 100 can tilt backwardly or vice versa. The range of the vertical tile angle allowed (for vertical tilting) can be pre-configured. In one embodiment, the range of the vertical tilt angle is between about ±45 degrees. In another embodiment, the range of the vertical tile angle is between about ±36 degrees.

In another example, actuation of the motor rotary device can cause horizontal tilting of the light emitting apparatus 100. In other words, the light emitting apparatus 100 can rotate about its geometric center such that the horizontal axis of the light emitting apparatus 100 forms a horizontal tilt angle relative to the X-axis (which is perpendicular to the support stand 186 and extends from the left to the right of the light emitting apparatus 100 when its front cover normally faces the target subject, as depicted in FIG. 1). For example, the left half of the light emitting apparatus 100 can tilt forwardly and the right half of the light emitting apparatus 100 can tilt backwardly or vice versa. The range of the horizontal tilt angle allowed (for horizontal tilting) can be pre-configured. In one embodiment, the range of the horizontal tilt angle is between about ±45 degrees. In another embodiment, the range of the horizontal tilt angle is between about ±36 degrees.

In yet another example, actuation of the motor rotary device 142 can cause circular rotation of the light emitting apparatus 100. For example, the light emitting apparatus 100 can be configured to rotate in a clockwise or counterclockwise direction. The range of the circular rotation can be pre-configured. In one embodiment, the range of the circular rotation is between about ±90 degrees. In another embodiment, the range of the horizontal tilt angle is between about ±45 degrees.

In certain embodiments, the light emitting apparatus 100 can be rotated by multiple motor rotary devices 142, each of which can rotate the light emitting apparatus 100 in a specific dimension. For example, the control box 120 can actuate three motor rotary devices 142, which control independent rotation of the light emitting apparatus 100 in three dimensions for vertical tilting, horizontal tilting, and circular rotation, respectively.

Figure 6:
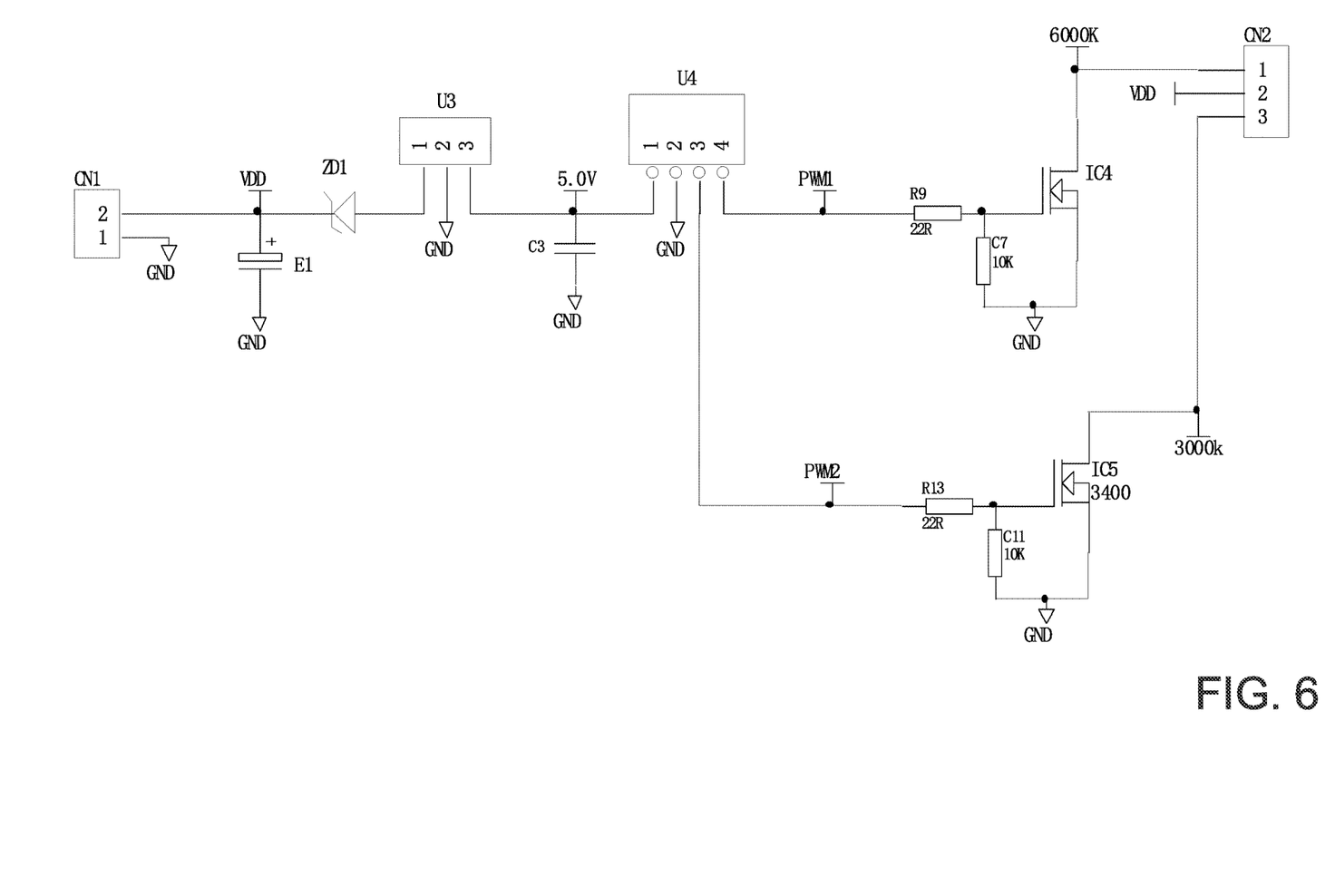
FIG. 6 is a circuit diagram depicting a power output control unit that can be incorporated in the live broadcast lighting system depicted in FIG. 1, according to one example embodiment.

Actuation of the motor rotary device 142 can be controlled by the PWM power output unit 134 described above. FIG. 6 shows one example circuit diagram of the PWM power output unit 134, according to one embodiment. As shown, the PWM power output unit 134 includes a first interface CN1, a second interface CN2, an electrolytic capacitor E1, a voltage stabilizing chip U3, and a voltage regulating chip U4. A pin 1 of the voltage stabilizing chip U3 is connected to an anode of a Zener diode ZD1. A cathode of the Zener diode ZD1 is connected to a pin 2 of the first interface CN1, an anode of the electrolytic capacitor E1, and an anode of the power supply. A cathode of the electrolytic capacitor E1 is grounded. A pin 1 of the first interface CN1 is connected to a cathode of the power supply. A pin 2 of the voltage stabilizing chip U3 is grounded. A pin 3 of the voltage stabilizing chip U3 is connected to a pin 1 of the voltage regulating chip U4. A pin 4 of the voltage regulating chip U4 is connected to a pin 1 of a first light regulating touch chip IC4 through a fourteenth resistor R14. A pin 2 of the first light regulating touch chip IC4 is connected to a pin 1 of the second interface CN2. A pin 3 of the first light regulating touch chip IC4 is grounded. A pin 3 of the voltage regulating chip U4 is connected to a pin 1 of a second light regulating touch chip IC5 through a sixteenth resistor R16. A pin 2 of the second light regulating touch chip IC5 is connected to a pin 3 of second interface CN2. A pin 2 of the second interface CN2 is connected to a power supply VDD terminal.

Rotation of Device Holder

As noted above, the device holder 150 can retain a video recording device 190 which is configured to capture an image or video of the target subject.

In the example embodiment depicted in FIGS. 1-3, the device holder 150 includes an L-shaped support bracket 152 and a clamp member 154 coupled together by a first screw 156. The clamp member includes two edges 158, the distance between which can be adjusted by a second screw 160. Thus, by adjusting the second screw 160, the video recording device 190 can be snuggly retained between the two edges 158 of the clamp member 154. The device holder 150 can be connected to the control box 120, e.g., via a U-shaped bracket 162. In the depicted embodiment, a lower end of the U-shaped bracket 162 is connected to the control box 120 by a pair of adjusting knobs 164. An upper end of the U-shaped bracket 162 has a connection groove 166 configured to receive an insert 168. A fastening member 170 can extend through the insert and securely couple the U-shaped bracket 162 to the device holder 150. Other known coupling mechanisms can also be employed to connect the device holder 150 to the control box 120.

In certain embodiments, the device holder 150 (and the video recording device 190 retained therein) can also be rotated. In one embodiment, a user can control rotation of the device holder 150 by interacting with the touch panel 138. In another embodiment, the user can control rotation of the device holder 150 by operating the remote control device 180.

In one embodiment, the control box 120 can include one or more motor rotary devices configured to rotate the device holder 150. For example, a motor rotary device 165 can be connected to the adjusting knobs 164 such that actuation of the motor rotary device 165 can cause corresponding rotation of the adjusting knobs 164, which in turn can cause the U-shaped bracket 162 and the connected device holder 150 to tilt vertically about its geometric center (similar to the vertical tilt of the light emitting apparatus 100 described above). In another embodiment, a motor rotary device 171 can be connected to the fastening member 170 such that actuation of the motor rotary device 171 can cause corresponding rotation of the fastening member 170, which in turn can cause the U-shaped bracket 162 and the connected device holder 150 to tilt horizontally about its geometric center (similar to the horizontal tilt of the light emitting apparatus 100 described above). In yet another embodiment, a motor rotary device 157 can be connected to the first screw 156 such that actuation of the motor rotary device 157 can cause corresponding rotation of the first screw 156, which in turn can cause the clamp member 154 and the video recording device 190 retained therein to rotate clockwise or counterclockwise relative to the L-shaped support bracket 152 (similar to the circular rotation of the light emitting apparatus 100 described above). In other words, the control box 120 can be configured to control independent rotation of the device holder 150 in three dimensions. In certain embodiments, the clockwise and/or counterclockwise rotation of the video recording device 190 can be configured to range from about −180 degrees to about +180 degrees, or range from about −90 degrees to about +90 degrees in a specific embodiment. Thus, in a specific example where the video recording device 190 is a smartphone, the smartphone can be freely rotated in either clockwise or counterclockwise direction so that the smartphone can switch between vertical and horizontal positions. Although the particular rotation mechanisms described above involve specific connecting components (i.e., the adjusting knobs 164, the fastening member 170, the first screw 156), it should be understood that other mechanisms can be used to rotate the device holder 150 based on the same principles described herein.

As described herein, the motor rotary devices used to rotate the device holder 150 are separate and work independently from those controlling rotation of the light emitting apparatus 100. Accordingly, rotation of the light emitting apparatus 100 does not cause corresponding rotation of the device holder 150 and vice versa.

Such independent rotation controls provide at least two advantages compared to the conventional design where a device holder (which holds a video recording device) is directly coupled to, or is an integral part of, a light emitting apparatus. First, the independent rotation controls disclosed herein allows more freedom and flexibility in controlling the lighting condition and shooting angles. For example, in conventional design, rotating the light emitting apparatus in one dimension also causes corresponding rotation of the video recording device in the same dimension. In contrast, the live broadcast lighting system 10 disclosed herein allows independent control of the lighting emitted by the light emitting apparatus 100 and the shooting angle of the video recording device 190, thus supporting more flexibility in scene creation with desired visual effects. Second, the inventor has discovered that in conventional design, vertical tilting of the light emitting apparatus can cause corresponding vertical tilting of the video recording device. Such concurrent vertical tilting can cause the weight center of the combined light emitting apparatus and the video recording device to shift forward or backward to such an extent that they become unstable on top of a tripod (especially when the video recording device is relatively heavy). In contrast, when the device holder 150 is configured to be rotatable independent of the rotation of the light emitting apparatus 100, the user can adjust the vertical tilting of light emitting apparatus 100 without vertical tilting the video recording device 190, thus reducing the risk of unstableness.

Motion Control

In certain embodiments, the electronic control circuit 122 can be configured to detect motion of the target subject and adjust lighting condition and/or video recording accordingly.

For example, one or more motion sensors 192 can be electronically coupled to the motion control unit 130 of the electronic control circuit 122. The one or more motion sensors 192 can be configured to detect movement of the target subject in front of the light emitting apparatus 100 and the video recording device 190. The one or more motion sensors 192 can be various types, such as infrared motion sensors, microwave motion sensors, ultrasonic motion sensors, impulse radio ultra-wideband radar sensors, digital video camera sensors equipped with image recognition software, and so on.

In one embodiment, one motion sensor 192 can be integrated with the video recording device 190. For example, the video or images acquired by the video recording device 190 can be analyzed by the electronic control circuit 122 to detect motion of the target subject. In another embodiment, at least one motion sensor can be separate from and operate independently of the video recording device 190. For example, a motion sensor can be placed on the device holder 150, or on the light emitting apparatus 100, or any other part of the live broadcast lighting system 10.

In certain embodiment, the electronic control circuit 122 can be configured to detect a plurality of gestures of the target subject, such as hand gestures, finger gestures, head movement gestures, and so on. Any gesture recognition techniques can be used, such as the ones disclosed by Caifeng Shan in the book chapter titled "Gesture Control for Consumer Electronics" (from the book titled "Multimedia Interaction and Intelligent User Interfaces"), the reference of which is incorporated herein by reference.

In some embodiments, the one or more motion sensors 192 can be configured to detect a gesture of the target subject and the electronic control circuit 122 can be configured to translate the gesture into a corresponding command which controls at least one of the following functions: rotation of the light emitting apparatus 100 (e.g., vertical tilting, horizontal tilting, circular rotation), rotation of the device holder 150 (e.g., vertical tilting, horizontal tilting, circular rotation), lighting of the light emitting apparatus 100 (e.g., turning ON/OFF of selected light sources 108, changing light intensity of selected light sources 108, switching between remote control and touchpad control, etc.), and operation of the video recording device 190 (e.g., start, pause, continue, stop video recording, zoom adjustment of the video recording, optical and/or digital filter adjustment of the video recording, etc.).

In some embodiments, the one or more motion sensors 192 can be configured to detect a positional change of the target subject and the electronic control circuit 122 can be configured to cause rotation of the light emitting apparatus 100 so as to ensure light emitted from the light emitting apparatus 100 remain focused on the target subject. In other words, the motion control unit 130 can track the movement of the target subject and automatically keeps the target subject in the spotlight. Any object tracking techniques can be used, such as the ones disclosed by Patel et al. in the paper titled "Motion based Object Tracking" and published in the International Journal of Electronics, Electrical and Computational System, the reference of which is incorporated herein by reference.

For example, when the target subject makes lateral movement (e.g., moving to left or right), the light emitting apparatus 100 can tilt horizontally so that the emitted light remains focused on the target subject. In another example, when the target subject moves closer or farther away from the video recording device 190, the light emitting apparatus 100 can tilt vertically so that the emitted light remains focused on the target subject.

In certain embodiments, in response to the movement of the target subject, not only the light emitting apparatus 100 can be rotated to keep the emitted light focused on the target subject, but also the light emitting pattern and/or intensity of the emitted light can be adjusted automatically so as to create certain desired visual effects. For example, the intensity of the emitted light can be decreased as the target subject moves closer to the video recording device 190 or increased as the target subject moves away from the video recording device 190.

In some embodiments, the one or more motion sensors 192 can be configured to detect a positional change of the target subject and the electronic control circuit 122 can be configured to cause rotation of the device holder 150 (and the video recording device 190 retained therein) so as to ensure the shooting angle of the video recording device 190 remains focused on the target subject. For example, the device holder 150 and the video recording device 190 can be configured to tilt horizontally when the target subject makes lateral movement, or tilt vertically when the target subject moves closer or farther away from the video recording device 190.

Various embodiments of motion control technology described herein are advantageous in that they allow the target subject to remotely self-adjust numerous aspects of a live streaming episode, including the lighting conditions, the shooting angles, or the like, in a natural and inconspicuous manner without having to interrupt the recording to make the adjustment or relying on another assistant to perform such adjustments. Thus, the technology disclosed herein can improve efficiency, flexibility, and convenience of controlling live broadcast lighting and recording.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples. In view of the many possible embodiments to which the principles of the disclosed technology may be applied, it should be recognized that the illustrated embodiments are only preferred examples and should not be taken as limiting the scope of the disclosed technology.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "connected" generally mean electrically, electromagnetically, and/or physically (e.g., mechanically or chemically) coupled or linked and does not exclude the presence of intermediate elements between the coupled or associated items absent specific contrary language.

As used herein, the term "approximately" and "about" means the listed value and any value that is within 20% of the listed value. For example, "about 100" means any value between about 80 and about 120, inclusive.

Directions and other relative references (e.g., inner, outer, upper, lower, etc.) may be used to facilitate discussion of the drawings and principles herein, but are not intended to be limiting. For example, certain terms may be used such as "inside," "outside,", "top," "down," "interior," "exterior," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same. As used herein, "and/or" means "and" or "or", as well as "and" and "or".

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. A live broadcast lighting system comprising:
a light emitting apparatus;
a control box being connected to the light emitting apparatus;
a device holder coupled to the control box, wherein the device holder is configured to releasably retain a video recording device; and
a motion sensor electronically coupled to the electronic control circuit, wherein the motion sensor is configured to detect movement of a target subject, wherein the light emitting apparatus is configured to shed light on the target subject;
wherein the control box comprises an electronic control circuit configured to control rotation of the light emitting apparatus; and
wherein the device holder is configured to be rotatable independent of the rotation of the light emitting apparatus.

2. The live broadcast lighting system of claim 1, wherein the electronic control circuit is configured to control the light emitting apparatus to rotate in three dimensions about a geometric center of the light emitting apparatus.

3. The live broadcast lighting system of claim 2, wherein the electronic control circuit is configured to control the rotation of the device holder in three dimensions about a geometric center of the device holder.

4. The live broadcast lighting system of claim 1, wherein the light emitting apparatus comprises a plurality of light sources, wherein the plurality of light sources comprise a first set of cold white LED lamp beads and a second set of warm white LED lamp beads, wherein the first set of cold white LED lamp beads and the second set of warm white LED lamp beads are juxtaposed around a peripheral region of the light emitting apparatus.

5. The live broadcast lighting system of claim 4, wherein the electronic control circuit is configured to independently control switching ON/OFF and adjusting light intensity of each light source so as to create a preprogrammed light emitting pattern.

6. The live broadcast lighting system of claim 5, wherein the preprogrammed light emitting pattern comprises a preprogrammed spatial distribution of the plurality of light sources that are turned ON or OFF.

7. The live broadcast lighting system of claim 5, wherein the preprogrammed light emitting pattern comprises a preprogrammed change of light intensity over a period of time for at least one of the plurality of light sources.

8. The live broadcast lighting system of claim 1, further comprising a remote control device configured to wirelessly communicate with the electronic control circuit so as to allow a user operating the remote control device to remotely control rotation and/or lighting of the light emitting apparatus.

9. The live broadcast lighting system of claim 8, wherein the remote control device comprises a mobile phone which is configured to communicate with electronic control circuit via Bluetooth protocol.

10. The live broadcast lighting system of claim 8, wherein the remote control device is configured to remotely control rotation of the device holder.

11. The live broadcast lighting system of claim 8, wherein the remote control device is configured to wirelessly communicate with the video recording device so as to allow the user to remotely control operation of the video recording device.

12. The live broadcast lighting system of claim 1, further comprising a touch panel electronically coupled to the electronic control circuit, wherein the touch panel is configured to allow a user to control rotation and/or lighting of the light emitting apparatus by interacting with a menu presented on the touch panel.

13. The live broadcast lighting system of claim 1, wherein the motion sensor is integrated with the video recording device.

14. The live broadcast lighting system of claim 1, wherein the motion sensor is separate from and operate independently of the video recording device.

15. The live broadcast lighting system of claim 1, wherein the motion sensor is configured to detect a gesture of the target subject and the electronic control circuit is configured to translate the gesture into a corresponding command which controls at least one of the functions comprising: rotation of the light emitting apparatus, rotation of the device holder, lighting of the light emitting apparatus, and operation of the video recording device.

16. The live broadcast lighting system of claim 1, wherein the motion sensor is configured to detect a positional change of the target subject and the electronic control circuit is configured to cause rotation of the light emitting apparatus so as to ensure light emitted from the light emitting apparatus remain focused on the target subject.

17. The live broadcast lighting system of claim 1, wherein the motion sensor is configured to detect a positional change of the target subject and the electronic control circuit is configured to change light emitting pattern or strength of the light emitting apparatus.

18. The live broadcast lighting system of claim 1, wherein the motion sensor is configured to detect a positional change of the target subject and the electronic control circuit is configured to cause rotation of the video recording device so as to ensure the target subject remains in focus of the video recording device.

19. A method for remote control of a live broadcast lighting system comprising a light emitting apparatus and a video recording device, the method comprising:
  remotely turning ON or OFF of a plurality of light sources of a light emitting apparatus;
  remotely changing light intensity of the plurality of light sources that are turned ON;
  remotely rotating the light emitting apparatus in three dimensions about a geometric center of the light emitting apparatus;
  remotely adjusting an angle of the video recording device independently of rotating the light emitting apparatus; and
  remotely controlling start and stop of a recording session by the video recording device;
  wherein rotating the light emitting apparatus comprises detecting a movement of a target subject and changing orientation of the light emitting apparatus in response to the movement of the target subject.

* * * * *